UNITED STATES PATENT OFFICE.

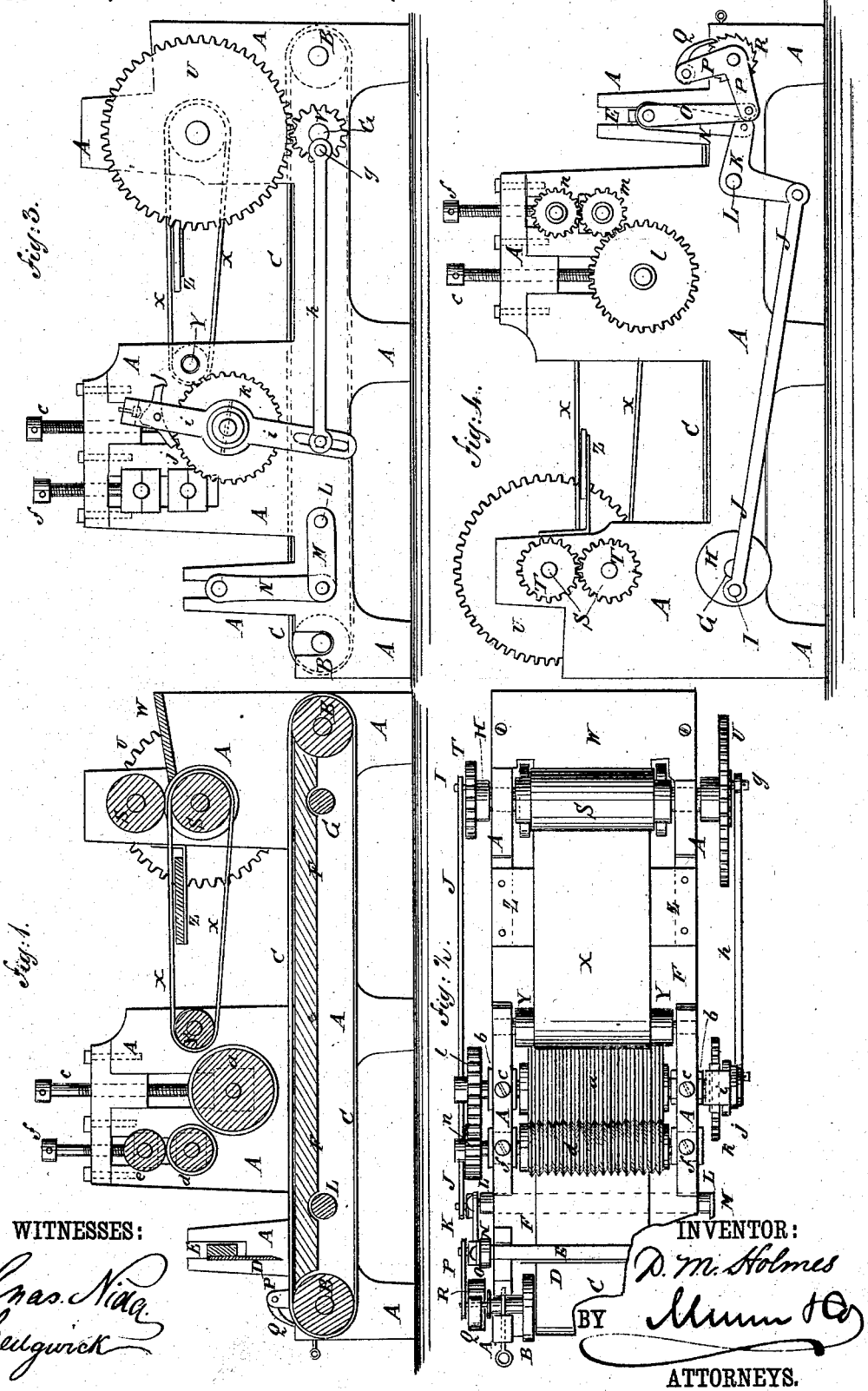

DANIEL M. HOLMES, OF CINCINNATI, OHIO.

BISCUIT-MACHINE.

SPECIFICATION forming part of Letters Patent No. 240,715, dated April 26, 1881.

Application filed December 29, 1880. (No model.)

*To all whom it may concern:*

Be it known that I, DANIEL M. HOLMES, of Cincinnati, in the county of Hamilton and State of Ohio, have invented a new and useful Improvement in Biscuit-Machines, of which the following is a specification.

Figure 1 is a sectional side elevation of my improvement. Fig. 2 is a plan view of the same, the smooth roller being removed. Fig. 3 is an elevation of one side of the machine. Fig. 4 is an elevation of the other side of the machine.

Similar letters of reference indicate corresponding parts.

The object of this invention is to crimp the sheets of dough upon the under side or upon both sides before the said sheets are cut into cakes.

The invention consists in constructing a biscuit-machine with two crimping-rollers placed at different levels and in such positions that their faces can be brought into contact with each other, or nearly so, and a smooth roller placed above the upper crimping-roller, so that a sheet of dough will be crimped upon both sides or upon the lower side, according as it is passed between the two crimping-rollers or between the upper crimping-roller and the smooth roller, in combination with the endless carrier-apron and sheet-rollers, as will be hereinafter fully described.

In the accompanying drawings, A represents the frame of the machine, to which are pivoted rollers B, around which passes an endless apron, C, to carry the sheets of dough to the cutters D, and to carry off the cakes. The upper part of the endless apron C that receives the sheet of dough is supported upon a stationary apron or platform, F, to prevent the said part from sagging. The cutters D are attached to a holder, E, that moves up and down in a guide-slot in the frame A, which cutters may be formed to cut the sheet into strips or long narrow cakes, or into cakes of circular or any other desired form.

To the rear part of the frame A is pivoted a shaft, G, to one end of which is attached a pulley, H, to receive the driving-belt. The pulley H is provided with a crank-pin, I, to which is pivoted the end of a connecting-bar, J. The other end of the connecting-bar J is pivoted to an arm of an elbow or angle lever, K, which is attached at its angle to the end of a shaft, L. The shaft L works in bearings in the frame A, and to its other end is attached the end of an arm, M. The other arm of the angle-lever K and the arm M are pivoted to the lower ends of two bars, N, the upper ends of which are pivoted to the ends of the cutter-holder E, so that the cutters will be moved up and down by the continuous forward movement of the driving mechanism. To the end of the cutter-holder E is also pivoted the upper end of a connecting-bar, O, the lower end of which is pivoted to the rear arm of an angle-lever, P. The angle-lever P is pivoted at its angle to a journal of the roller B, and to its upper arm is pivoted a pawl, Q, which engages with the teeth of a ratchet-wheel, R, rigidly attached to the journal of the said roller B. With this construction the pawl Q will be drawn back and the carrier-apron C allowed to stand still while the cutters are descending to make a cut, and the said pawl will be operated to carry the carrier-apron forward while the cutters are being raised. As thus far described there is nothing new in the construction.

S are the rollers by means of which the dough is rolled into a sheet, which rollers revolve in bearings attached to the frame A, and are connected at one end by gear-wheels T, to cause them to revolve at the same speed. To the other end of one of the rollers S, preferably the lower one, is attached a large gear-wheel, U, into the teeth of which mesh the teeth of a small gear-wheel, V, attached to the end of the driving-shaft G.

W represents the board from which the dough is fed to the rollers S.

X is an endless carrier-belt extending around and from the roller S to a roll, Y, which is a little above the axis of the crimper $a$. This belt is prevented from sagging on top by a supporting-board, Z.

$a$ is a roller the face of which is corrugated with a number of ring-grooves. The roller $a$ is placed in the rear of the cutters D, and its journals revolve in bearings $b$ placed in vertical slots in the frame A.

To the bearings $b$ are swiveled the ends of screws $c$, which pass through screw-holes in a bar or cap attached to the frame A, so that the roller a can be raised and lowered as the thickness of the sheet of dough may require.

With this construction the sheet of dough is carried by the endless apron C above and a little in front of the crimping-roller a, where is placed a similar crimping-roller, d, so that by passing the sheet of dough between the rollers a d both sides of the said sheet will be crimped, and by passing the sheet of dough over the upper crimping-roller, d, the lower side of the said sheet will be crimped. In crimping the lower side of the sheet of dough the said sheet is held down upon the roller d by a smooth roller, e, placed above said roller d. The bearings of the rollers d e are placed in vertical slots in the frame A, and to the bearings of the upper roller, e, are swiveled the ends of screws f, which pass through screw-holes in the bar or cap attached to the frame A, so that the said roller e can be raised and lowered as the thickness of the sheet of dough may require.

To the gear-wheel V, attached to the drive-shaft G, is attached a crank-pin, g, to which is pivoted the end of a connecting-bar, h. The other end of the connecting-bar h is pivoted to the lower end of the lever i, which rides upon and is fulcrumed to the journal of the lower crimping-roller, a. The lower end of the lever i is slotted longitudinally to receive the pivoting-bolt of the connecting-bar h, so that the throw of the lever i can be regulated as required.

To the upper end of the lever i is pivoted a pawl, j, which engages with the teeth of a ratchet-wheel, k, attached to the journal of the crimping-roller a. The mechanism that operates the pawl j is so arranged as to rotate the crimping-roller a at the same time that the endless apron C and the sheet of dough are carried forward by the pawl Q. The pawl j is made double, so that it can be reversed to cause it to feed the roller a in either direction, according as the sheet of dough may be passing over or under the said roller a. To the other journal of the roller a is attached a gear-wheel, l, the teeth of which mesh into the teeth of a gear-wheel, m, attached to the journal of the upper crimping-roller, d, so that the roller d will be revolved by the roller a, but in the opposite direction. The teeth of the gear-wheel m mesh into the teeth of a gear-wheel, n, attached to a journal of the smooth roller e, so that the said roller e will be revolved by the roller d, but in the opposite direction.

Having thus described my invention, I claim as new and desire to secure by Letters Patent—

In a biscuit-machine, the combination, with the sheeting-rolls S, of the endless carrier X, the crimping-rolls a d, and the spring-pressed smooth roll e, whereby the sheet of dough may be crimped on one or both sides, as shown and described.

DANIEL M. HOLMES.

Witnesses:
GEO. S. SNIDER,
GEO. H. LEACH.